United States Patent
Tseng et al.

(10) Patent No.: US 11,686,625 B2
(45) Date of Patent: Jun. 27, 2023

(54) METHOD FOR MEASURING TEMPERATURE, PORTABLE ELECTRONIC DEVICE AND VIDEO CONFERENCE

(71) Applicant: AmTRAN Technology Co., Ltd., New Taipei (TW)

(72) Inventors: Chiung-Wen Tseng, New Taipei (TW); Yi-Xuan Huang, Yilan County (TW); Yu-An Hsu, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 207 days.

(21) Appl. No.: 17/137,325

(22) Filed: Dec. 29, 2020

(65) Prior Publication Data

US 2021/0215552 A1    Jul. 15, 2021

Related U.S. Application Data

(60) Provisional application No. 62/958,725, filed on Jan. 9, 2020.

(51) Int. Cl.
*G01K 7/42*    (2006.01)

(52) U.S. Cl.
CPC ......... *G01K 7/425* (2013.01); *G01K 2201/00* (2013.01)

(58) Field of Classification Search
CPC .................................................... G01K 7/425
USPC ........................................................ 702/130
See application file for complete search history.

(56) References Cited

U.S. PATENT DOCUMENTS

| | | | |
|---|---|---|---|
| 5,819,845 A * | 10/1998 | Ryu | F24F 11/62 236/78 D |
| 8,473,238 B2 | 6/2013 | Miller et al. | |
| 8,517,602 B2 | 8/2013 | Courtois | |
| 8,729,977 B2 | 5/2014 | Filipovic et al. | |
| 8,996,327 B2 | 3/2015 | Ge et al. | |
| 2007/0200004 A1* | 8/2007 | Kasper | F24F 11/30 236/44 C |
| 2009/0140059 A1* | 6/2009 | Barton | F24F 11/30 236/51 |
| 2010/0226487 A1* | 9/2010 | Harder | H04N 21/4436 379/202.01 |
| 2019/0178521 A1* | 6/2019 | Zimmerman | G05D 23/1931 |
| 2021/0095881 A1* | 4/2021 | Lian | F24F 11/77 |

* cited by examiner

*Primary Examiner* — Ricky Go
(74) *Attorney, Agent, or Firm* — CKC & Partners Co., LLC

(57) ABSTRACT

A method for measuring temperature is used to obtain a room temperature of a room. The method for measuring temperature includes: obtaining a first temperature inside an operating area in a portable electronic device in the room; obtaining a second temperature outside the operating area in the portable electronic device by a first temperature sensor; calculating a temperature difference between the first temperature and the second temperature; obtaining a compensation temperature according to the temperature difference and a compensation temperature table; and calculating the room temperature according to the second temperature and the compensation temperature.

10 Claims, 4 Drawing Sheets

METHOD FOR MEASURING TEMPERATURE, PORTABLE ELECTRONIC DEVICE AND VIDEO CONFERENCE

RELATED APPLICATION

This application claims priority to U.S. Provisional Application Ser. No. 62/958,725, filed Jan. 9, 2020, which is herein incorporated by reference in its entirety.

BACKGROUND

Field of Invention

The present disclosure relates to measurement method, device and system. More particularly, the present disclosure relates to a method for measuring temperature, a portable electronic device, and a video conference.

Description of Related Art

During meeting, the participants might be affected by the environment of the meeting room. For example, if environment temperature is high, this might affect the participants so that the efficiency and progress of the meeting will be affected.

Temperature sensors are affected by heat generated from high load components in devices. Therefore, the temperature sensors cannot measure the outdoor temperature around the devices. Hence, there are technology defects and shortcomings in this field, which need to be solved.

SUMMARY

One aspect of the present disclosure provides a method for measuring temperature. The method for measuring temperature is configured to obtain a room temperature of a room and includes the following steps: obtaining a first temperature inside an operation area of a portable electronic device in the room; obtaining a second temperature outside the operation area of the portable electronic device by a first temperature sensor; calculating a temperature difference between the first temperature and the second temperature; obtaining a compensation temperature according to the temperature difference and a compensation temperature table; and calculating the room temperature according to the second temperature and the compensation temperature.

Another aspect of the present disclosure provides a portable electronic device. The portable electronic device is configured to calculate a room temperature of a room, and includes a shell, an operation area, a first temperature sensor, and a processor. The shell includes an accommodating space. The operation area is disposed inside the accommodating space. The operation area includes a first temperature. The first temperature sensor is configured to obtain a second temperature outside the operation area. The processor is configured to calculate a temperature difference between the first temperature and the second temperature, the processor is configured to obtain a compensation temperature according to the temperature difference and a compensation temperature table, and the processor is configured to calculate a room temperature according to the second temperature and the compensation temperature.

Another aspect of the present disclosure provides a video conference system. The video conference system includes at least one portable electronic device, a display device, and a processor. The at least one portable electronic device is configured to calculate a room temperature. The display device is configured to display the room temperature of the at least one portable electronic device. The processor is configured to receive the room temperature and control an air conditioning device according to the room temperature.

It is to be understood that both the foregoing general description and the following detailed description are by examples, and are intended to provide further explanation of the present disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
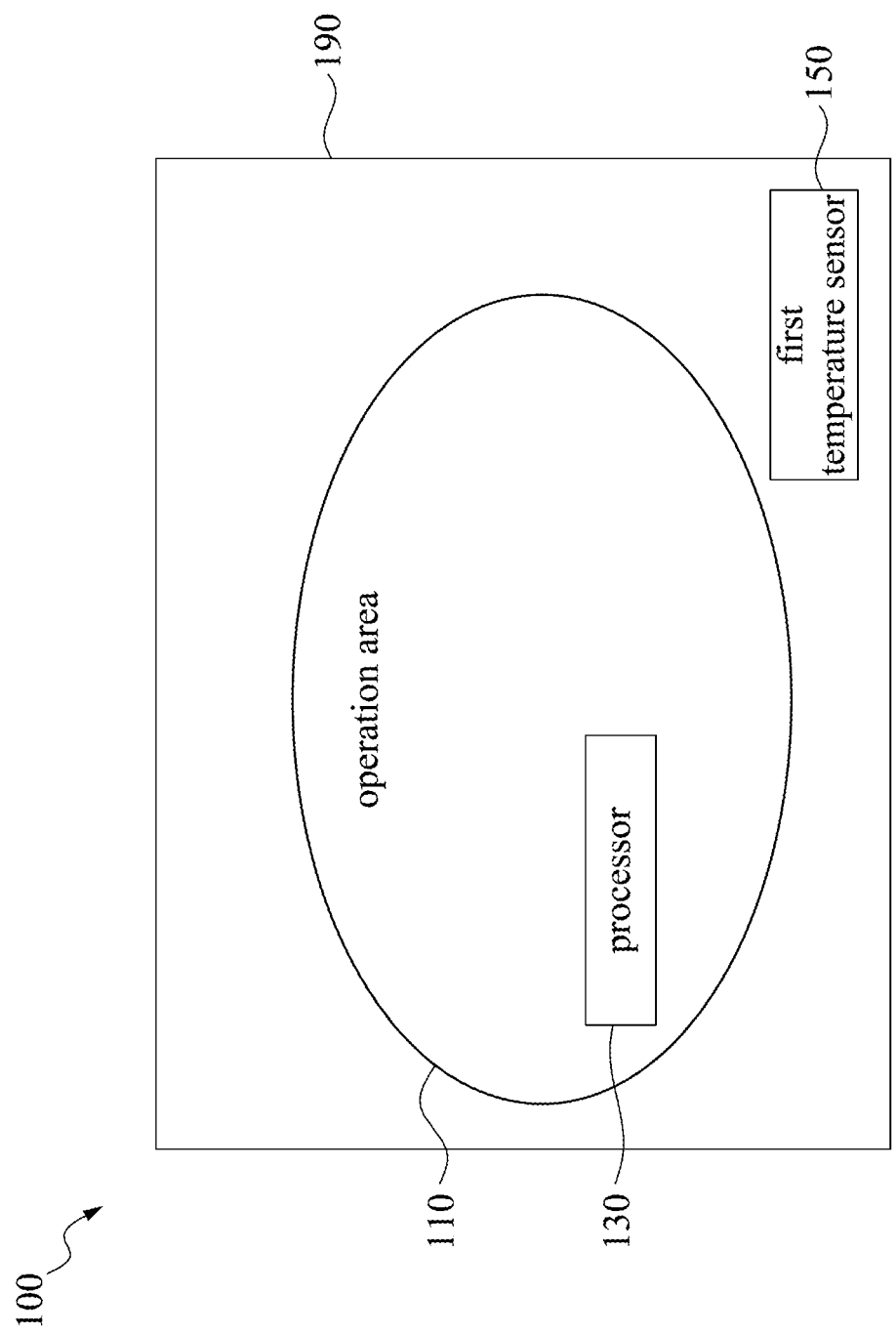
FIG. 1 depicts a schematic diagram of a portable electronic device according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts.

FIG. 1 depicts a schematic diagram of a portable electronic device according to one embodiment of the present disclosure. As shown in FIG. 1, in some embodiments, the portable electronic device 100 includes a shell 190, an operation area 110, a processor 130, and a first temperature sensor 150.

In some embodiments, the operation area 110 includes areas which surround high load components. The high load components can be central processors, memories, graphics chips, 3D (3-dimension) acceleration chips or power transistors. In detail, the high load components are located in the accommodating space of the shell 190. The high load components generate waste heat after powering up, which rises the temperature in the surrounding area. The surrounding area is the operation area 110. In some embodiments, the high load components are provided with built-in digital temperature sensors. In other words, the built-in digital temperature sensors are integrated in various high load components. Moreover, the high load components read a first temperature measured from the digital temperature sensors by PECI (Platform Environmental Control Interface) protocol, and transmit the first temperature to a processor so as to calculate a plurality of temperature measurement data.

In some embodiments, please refer to FIG. 1, the operation area 110 is disposed or located inside anywhere of the accommodating space in the shell 190, and the shape of the operation area 110 is not limited to ellipse shown in FIG. 1.

In some embodiments, the first temperature sensor 150 includes thermocouple sensors, resistive temperature sensors, thermistors, and fiber optic temperature sensors. The first temperature sensor 150 is configured to obtain a second temperature which is measured outside the operation area 110 and close to the inner edge of the shell 190. The first temperature sensor 150 is located in the accommodating space of the shell 190. The location of the first temperature sensor 150 is outside the operation area 110 and close to the inner edge of the shell 190.

In some embodiments, the processor 130 includes but not limited to a single processor and the integration of many micro-processors, for example, central processors (Central Processing Unit, CPU) or graphic processors (Graphic Processing Unit, GPU) and so on. The processor (or the micro-processors) is coupled to the first temperature sensor 150. Therefore, the processor 130 receives the plurality of temperature measurement data from the first temperature sensor 150, and implements the method for measuring temperature according to the plurality of temperature measurement data. In order to facilitate the understanding of the method for measuring temperature, the detail steps of the method will be explained in the following paragraphs.

Figure 2:
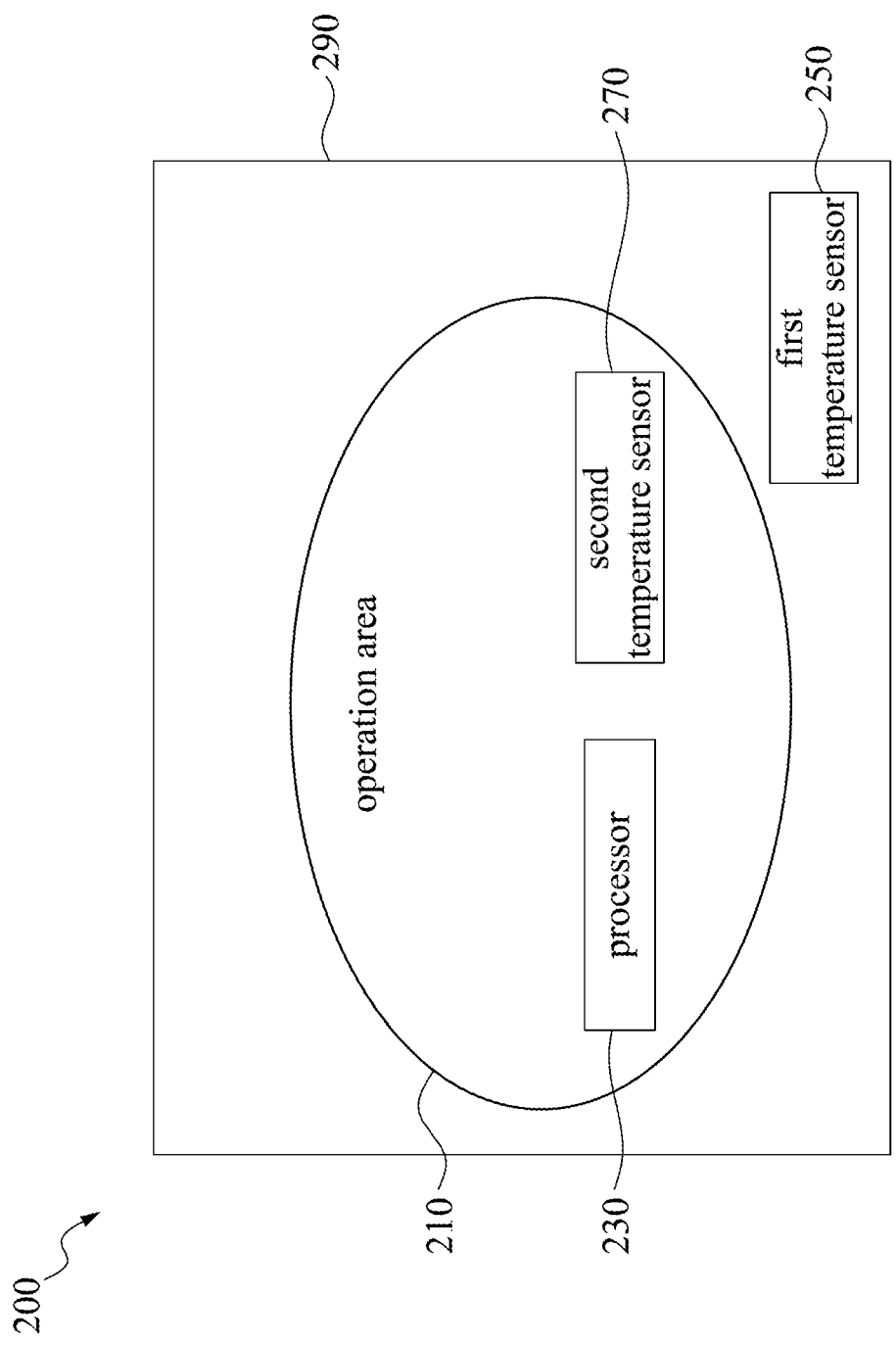
FIG. 2 depicts a schematic diagram of a portable electronic device according to one embodiment of the present disclosure.

FIG. 2 depicts a schematic diagram of a portable electronic device according to one embodiment of the present disclosure. As shown in FIG. 2, in some embodiments, the portable electronic device 200 includes a shell 290, an operation area 210, a processor 230, a first temperature sensor 250, and a second temperature sensor 270.

In some embodiments, FIG. 2 is another embodiment of the present disclosure, compared to the portable electronic device 100 shown in FIG. 1, the second temperature sensor 270 is disposed inside the operation area 210 in the portable electronic device 200 shown in FIG. 2, and the second temperature sensor 270 is coupled to the processor 230. The second temperature sensor 270 is configured to obtain the first temperature of the operation area 210 in order to implement the method for measuring temperature. The function and the structure of the rest part of the portable electronic device 200 is the same as the portable electronic device 100 in FIG. 1, and repetitious details are omitted herein.

Figure 3:
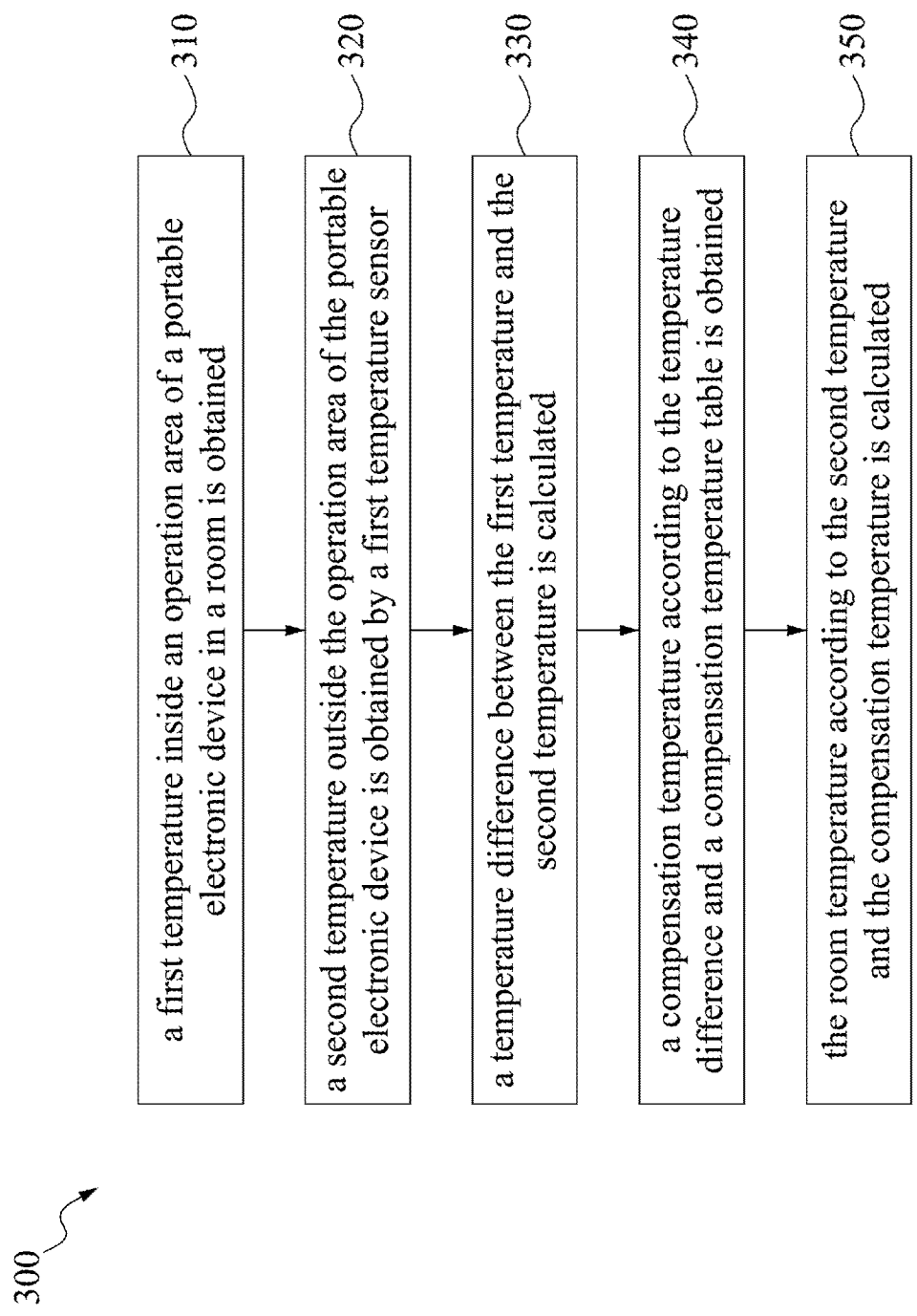
FIG. 3 depicts a flow chart of a method for measuring temperature according to one embodiment of the present disclosure.

FIG. 3 depicts a flow chart of a method for measuring temperature according to one embodiment of the present disclosure. As shown in FIG. 3, in some embodiments, the method 300 for measuring temperature can be implemented by the portable electronic device 100 shown in FIG. 1 and the portable electronic device 200 shown in FIG. 2. In some embodiments, the detail steps of the method 300 for measuring temperature will be explained in the following paragraphs.

In step 310, a first temperature inside an operation area of a portable electronic device in a room is obtained.

In some embodiments, please refer to FIG. 1, based on the method 300 for measuring temperature, the first temperature can be obtained by the high load components of the portable electronic device 100 shown in FIG. 1. In some embodiments, the high load components include the processor 130, and the digital temperature sensors are integrated in the processor 130. The first temperature of the operation area 110 can be obtained by the digital temperature sensors.

In some embodiments, please refer to FIG. 2, based on the method 300 for measuring temperature, the first temperature inside the operation area can be obtained by the second temperature sensor 270. The second temperature sensor 270 transmits the first temperature to the processor 230 so as to calculate the plurality of temperature measurement data.

In step 320, a second temperature outside the operation area of the portable electronic device is obtained by a first temperature sensor.

In some embodiments, please refer to FIG. 1, based on the method 300 for measuring temperature, the second temperature, which is measured outside the operation area 110 and close to the inner edge of the shell 190, can be obtained by the first temperature sensor 150 of the portable electronic device 100.

In step 330, a temperature difference between the first temperature and the second temperature is calculated.

In some embodiments, please refer to FIG. 1, based on the method 300 for measuring temperature, the processor 130 receives the second temperature from the first temperature sensor 150 and the first temperature of the operation area 110, and the processor 130 subtracts the second temperature from the first temperature to obtain the temperature difference.

In step 340, a compensation temperature according to the temperature difference and a temperature compensation table is obtained.

In some embodiments, please refer to FIG. 1, based on the method 300 for measuring temperature, the processor 130 can obtain the compensation temperature corresponding to the temperature difference according to the temperature difference and the compensation temperature table built-in the processor 130.

In step 350, the room temperature according to the second temperature and the compensation temperature is calculated.

In some embodiments, please refer to FIG. 1, based on the method for measuring temperature 300, the second temperature and the compensation temperature are added by the processor 130 so as to obtain the room temperature.

In some embodiments, please refer to FIG. 1, a third temperature sensor can obtain an environment temperature outside the portable electronic device 100. The third temperature sensor can be communicatively coupled to the processor 130 of the portable electronic device 100, and the third temperature sensor transfers the environment temperature back to the processor 130. The processor 130 generates a built-in compensation temperature table according to the environment temperature, the second temperature measured from the first temperature sensor 150, and the first temperature of the operation area 110 measured by the digital temperature sensor of the processor 130. The detail steps for generating the compensation temperature table will be explained in the following paragraphs. The third temperature sensor includes but not limited to thermocouple sensors, resistive temperature sensors, thermistors, fiber optic temperature sensors, and traditional thermometers.

In some embodiments, after the portable electronic device 100 starts, the portable electronic device 100 can be pre-measured continuously changing temperature values with time by time in a specific environment. The portable electronic device 100 generates aforementioned temperature compensation according to the continuously changing temperature values, the corresponding first temperature and the second temperature in the portable electronic device 100. For example, please refer to FIG. 1, the compensation temperature table which is built in the processor 130 is a kind of look-up table, the compensation temperature table is generated from the derivation steps of the method 300 for measuring temperature. First of all, the third temperature sensor obtains the environment temperature outside the portable electronic device 100. The environment temperature which is measured by the third temperature sensor is the actual temperature of the specific environment. Subsequently, the processor 130 calculates the corresponding compensation temperature under the different environment temperatures according to the second and the environment temperature which are measured by the first temperature sensor 150 and the actual temperature. In practice, the processor 130 subtracts the corresponding environment temperature from the corresponding second temperature under the different environment temperatures so as to generate the corresponding compensation temperature. Furthermore, the processor 130 obtains the temperature difference corresponding to the first temperature and the second temperature in the operation area 110 under the different environment temperatures. The processor 130 constructs a compensation temperature table according to a relation between the temperature difference and the compensation temperature. The above-mentioned compensation temperature table can be built in the processor 130. For example, parts of the compensation temperature table are listed as follow:

TABLE 1

| time (minutes) | temperature difference (° C.) | compensation temperature (° C.) |
|---|---|---|
| 0 | 4.12 | 0.41 |
| 3 | 4.81 | 1.24 |
| 6 | 6.25 | 1.76 |
| 9 | 7.36 | 2.39 |
| 12 | 8.19 | 2.80 |
| 15 | 8.75 | 3.00 |
| 18 | 9.44 | 3.32 |
| 21 | 9.45 | 3.69 |
| 24 | 9.93 | 3.81 |
| 27 | 10.07 | 4.08 |
| 30 | 10.46 | 4.21 |

In some embodiments, the processor 130 constructs a plurality of compensation temperature tables under the different environment temperatures. Therefore, the present disclosure constructs a plurality of compensation temperature tables corresponding to the different environment temperatures, such that the portable electronic device 100 and the method 300 for measuring temperature preform an adaptive compensation according to the situation of the environment temperature.

In some embodiments, please refer to FIG. 1, the compensation temperature table is generated from the derivation steps of the method 300 for measuring temperature. First of all, the first temperature sensor 150 obtains the second temperature in the first time interval. Next, the processor 130 subtracts the environment temperature from the second temperature measured by the first temperature sensor 150 in the first time interval to obtain the compensation temperature. Furthermore, the processor 130 obtains a first temperature inside the operation area in the first time interval. In addition, the processor 130 subtracts the second temperature from the first temperature to obtain a temperature difference in the first time interval.

Moreover, the first temperature sensor 150 obtains a second temperature in the second time interval. Next, the processor 130 subtracts the environment temperature from the second temperature measured by the first temperature sensor 150 to obtain a compensation temperature. Furthermore, the processor 130 obtains a first temperature inside the operation area in the second time interval. In addition, the processor 130 subtracts the second temperature from the first temperature to obtain a temperature difference in the second time interval.

Finally, the processor 130 matches the temperature difference and the compensation temperature in the first time interval, and matches the temperature difference and the compensation temperature in the second time interval. Next, the processor 130 sorts the temperature difference and the compensation temperature corresponding to the first time interval and the second time interval so as to generate a compensation temperature table.

In some embodiments, please refer to FIG. 1, the first temperature sensor 150 obtains second temperatures outside the operation area 110 per 10 seconds. The processor 130 averages the 18 temperature measurement data of the second temperatures per 3 minutes, which is measured for 2 hours continuously. The calculations are detailed below:

$$Temp_n = \frac{\sum_{t=1}^{18} Temp((t \times 10) + (180 \times (n-1)))}{18} \mid n = 1, \ldots, 40 \quad \text{formula 1}$$

Please refer to formula 1, $Temp_n$ is the average of the second temperature per 3 minutes.

Moreover, the environment temperatures outside the portable electronic device 100 are obtained per 10 seconds. The processor 130 averages the 18 temperature measurement data of the environment temperatures per 3 minutes which is measured for 2 hours continuously. The calculation are detailed below:

$$External_n = \frac{\sum_{t=1}^{18} External((t \times 10) + (180 \times (n-1)))}{18} \mid n = 1, \ldots, 40 \quad \text{formula 2}$$

Please refer to formula 2, $External_n$ is the average of the environment temperatures per 3 minutes.

Furthermore, please refer to FIG. 1, the digital temperature sensor of the high loads component obtains first temperatures inside the operation area 110 per 10 seconds. The processor 130 averages the 18 temperature measurement data of the first temperatures per 3 minutes, which is measured for 2 hours continuously. The calculations are detailed below:

$$Internal_n = \frac{\sum_{t=1}^{18} Internal((t \times 10) + (180 \times (n-1)))}{18} \mid n = 1, \ldots, 40 \quad \text{formula 3}$$

Please refer to formula 3, $Internal_n$ is the average of the first temperatures per 3 minutes.

Subsequently, the processor 130 obtains the temperature difference and the compensation temperature according to the average of the second temperatures, the average of the environment temperatures, and the average of the first temperatures. The temperature difference and the compensation temperature are continuously measured for 2 hours to obtain 40 data respectively. The calculations are detailed below:

$$\Delta T_{2(temp)} = External_n - Temp_n \mid n = 1, \ldots, 40 \quad \text{formula 4}$$

$$\Delta T_1 = Internal_n - External_n \mid n = 1, \ldots, 40 \quad \text{formula 5}$$

Please refer to formula 4 and formula 5, $\Delta T2(temp)$ is the compensation temperature subtracted the average of the environment temperature from the average of the second temperature. ΔT1 is the temperature difference subtracted the average of the second temperature from the average of the first temperature. As shown in the table 1, the processor 130 constructs the compensation temperature table according to the compensation temperature and the temperature difference per 3 minutes.

In some embodiments, please refer to FIG. 1 and FIG. 3, based on the method 300 for measuring temperature, the processor 130 implements the step 310 to the step 340, for example, the processor 130 looks up the compensation temperature table to calculates the temperature difference. If the processor 130 cannot obtain the compensation temperature corresponding to the temperature difference according to the temperature difference in the compensation temperature table, the processor 130 finds out the time interval which is the closest time interval to the temperature difference according to the compensation temperature table. The processor 130 calculates the compensation temperature, and then calculates a room temperature according to the second temperature and the expected compensation temperature.

In some embodiments, the method for calculating compensation temperature includes interpolation, extrapolation and the combination of the aforementioned methods.

In some embodiments, please refer to FIG. 1, the method for calculating the compensation temperature which is calculated by the processor 130 includes but not limited to interpolation. The calculations of the above interpolation method are detailed below:

$$\frac{\Delta T_1 - \Delta T_{1(min)}}{\Delta T_{1(max)} - \Delta T_{1(min)}} = \frac{\Delta T_{2(temp)} - \Delta T_{2(min)}}{\Delta T_{2(max)} - \Delta T_{2(min)}} \quad \text{formula 6}$$

Please refer to formula 6, ΔT1 is the temperature difference. ΔT1(min) is the smallest temperature difference in the time interval. ΔT1(max) is the biggest temperature difference in the time interval. ΔT2(temp) is the expected compensation temperature. ΔT2(min) is the smallest compensation temperature in the time interval. ΔT2(max) is the biggest compensation temperature in the time interval.

In some embodiments, please refer to table 1, FIG. 1 and FIG. 3, firstly, the step 340 of the method 300 for measuring temperature is implemented by the processor 130. For example, the processor 130 obtains a temperature difference 8.24. Then, the processor 130 looks up the table 1 according to the temperature difference 8.24. If the processor 130 cannot find out the compensation temperature corresponding to the temperature difference in the table 1, the processor 130 calculates the expected compensation temperature with the table 1 by the interpolation method. The time interval which is the closest time interval to the temperature difference 8.24 is between 12 minutes and 15 minutes. As a result, the processor 130 obtains the smallest the temperature difference 8.19 and the smallest compensation temperature 2.80 in the time interval, and the processor 130 obtains the biggest temperature difference 8.75 and the biggest compensation temperature 3.00 in the time interval.

Moreover, please refer to formula 6, ΔT2 (temp) at the upper right side of the equation is the only one unknown number in the formula 6, and is also the expected compensation temperature by the interpolation method. Please refer to the left side of equation of the formula 6. At first, the processor 130 subtracts the smallest temperature difference 8.19 from the temperature difference 8.24 to obtain the difference 0.05 in the time interval. Then, the processor 130 divides the difference 0.05 by the value 0.56 so as to obtain the value 0.0893 (round off the value to the ten-thousandth digit). The value 0.56 is obtained by subtracting the temperature difference 8.19 from the biggest temperature difference 8.75 in the time interval.

After that, the right side of equation is calculated according to the value 0.0893 obtained from the left side of the equation. Then, the value 0.0893 obtained from the left side of the equation is multiplied by the value 0.20 so as to obtain the value 0.018 (round off the value to the thousandth digit). The value 0.20 is obtained by subtracting the smallest compensation temperature 2.80 from the biggest compensation temperature 3.00 at the lower right side of the equation in the time interval. Furthermore, the value 0.018 is added by the smallest compensation temperature 2.80. The processor 130 finally obtains the expected compensation temperature 2.818 (round off the value to the thousandth digit) in the time interval. Therefore, when the temperature difference is 8.24, the second temperature needs to be compensated by the compensation temperature 2.818.

Figure 4:
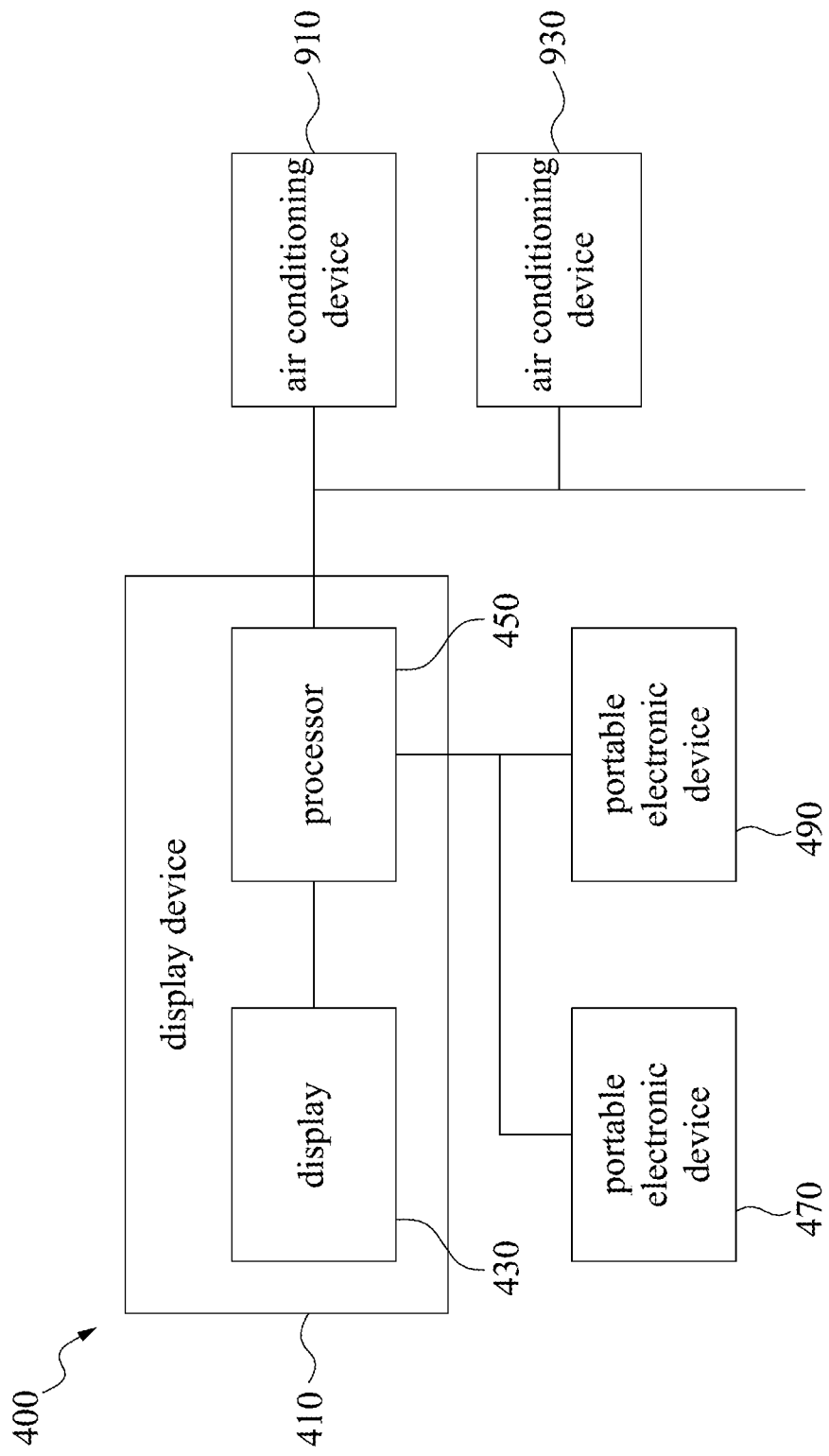
FIG. 4 depicts a schematic diagram of a video conference system according to one embodiment of the present disclosure.

FIG. 4 depicts a schematic diagram of a video conference system according to one embodiment of the present disclosure. As shown in FIG. 4, in some embodiments, the video conference system 400 includes a display device 410, at least one portable electronic device (e.g., one of a portable electronic device 470 and a portable electronic device 490 shown in FIG. 4), an air conditioning device 910 and an air conditioning device 930. The display device 410 includes a display 430 and a processor 450.

In some embodiments, the portable electronic device 470 and the portable electronic device 490 are the portable electronic device of the present disclosure, for example, the portable electronic device 100 shown in FIG. 1 or the portable electronic device 200 shown in FIG. 2. The portable electronic device 470 and the portable electronic device 490 are communicatively coupled to the processor 450, and the portable electronic device 470 and the portable electronic device 490 transmit the room temperature to the processor 450. The processor 450 shows a plurality of room temperatures on the display device 430 according to the room temperatures, and the processor 450 controls the air conditioning device 910 and the air conditioning device 930.

Based on the above embodiments, the present disclosure provides a portable electronic device, a method for temperature measuring and a video conference system. The present disclosure applies the method for measuring temperature into the portable electronic device and the video conference system. There is a very small error between a room temperature obtained from a portable electronic device and a present environment temperature by using the method for measuring temperature of the present disclosure. The room temperature can be measured accurately by using the method for measuring temperature of the present disclosure so as to provide participants to maintain an appropriate temperature during the video conference, and the conference can be facilitated.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this present disclosure provided the y fall within the scope of the following claims.

What is claimed is:

1. A method for measuring temperature, configured to obtain a room temperature of a room, comprising:
   obtaining an environment temperature;
   obtaining a first temperature inside an operation area of a portable electronic device in the room;
   obtaining a second temperature outside the operation area of the portable electronic device by a first temperature sensor;
   calculating a temperature difference between the first temperature and the second temperature;
   obtaining a compensation temperature by subtracting the environment temperature from the second temperature;
   generating a compensation temperature table according to the temperature difference and the compensation temperature, wherein the compensation temperature table comprises a look-up table; and
   calculating the room temperature according to the first temperature, the second temperature and the compensation temperature table.

2. The method for measuring temperature of claim 1, further comprising:
   obtaining the first temperature inside the operation area of the portable electronic device by a second temperature sensor.

3. The method for measuring temperature of claim 1, wherein the step of calculating the room temperature according to the first temperature, the second temperature and the compensation temperature table comprises:
   obtaining the compensation temperature according to the temperature difference and the compensation temperature table; and
   calculating the room temperature according to the second temperature and the compensation temperature.

4. The method for measuring temperature of claim 3, further comprising:
   obtaining the first temperature and the second temperature of a first time interval, and calculating the temperature difference of the first time interval according to the first temperature and the second temperature of the first time interval;
   obtaining the first temperature and the second temperature of a second time interval, and calculating the temperature difference of second time interval according to the first temperature and the second temperature of the second time interval;
   subtracting the environment temperature of the first time interval from the second temperature of the first time interval to generate the compensation temperature of the second time interval;
   subtracting the environment temperature of the second time interval from the second temperature of the second time interval to generate the compensation temperature of the second time interval; and
   generating the compensation temperature table according to the temperature difference of the first time interval, the compensation temperature of the first time interval, the temperature difference of the second time interval, and the compensation temperature of the second time interval.

5. The method for measuring temperature of claim 1, further comprising:
   calculating the compensation temperature if the compensation temperature is not obtained according to the temperature difference and the compensation temperature table; and
   calculating the room temperature according to the compensation temperature and the second temperature.

6. The method for measuring temperature of claim 5, wherein an interpolation method or an extrapolation method is used to calculate the compensation temperature.

7. A portable electronic device, configured to calculate a room temperature of a room, comprising:
   a shell, comprising an accommodating space;
   an operation area, disposed inside the accommodating space, the operation area being provided with a first temperature;
   a first temperature sensor, configured to obtain a second temperature outside the operation area; and
   a processor, coupled to the first temperature sensor, wherein the processor obtains an environment temperature, the first temperature, and the second temperature, calculates a temperature difference according to the first temperature and the second temperature, obtains a compensation temperature by subtracting the environment temperature from the second temperature, generates a compensation temperature table according to the temperature difference and the compensation temperature and calculates the room temperature according to the second temperature and the compensation temperature, wherein the compensation temperature table comprises a look-up table.

8. The portable electronic device of claim 7, further comprising:
   a second temperature sensor, disposed in the operation area, coupled to the processor, and configured to obtain the first temperature in the operation area.

9. The portable electronic device of claim 7, wherein the processor obtains the compensation temperature according to the temperature difference and the compensation temperature table, and calculates the room temperature according to the second temperature and the compensation temperature.

10. A video conference system, comprising:
   at least one portable electronic device of claim 7, configured to calculate a room temperature;
   a display device, configured to display the room temperature of the at least one portable electronic device, wherein the at least one portable electronic device and the display device are not a same device; and
   a processor, configured to receive the room temperature and control an air conditioning device according to the room temperature.

* * * * *